United States Patent
Walters et al.

(10) Patent No.: US 7,587,526 B2
(45) Date of Patent: Sep. 8, 2009

(54) ENDIANNESS INDEPENDENT DATA STRUCTURES

(75) Inventors: Andrew W. Walters, San Jose, CA (US); Ankur Varma, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 451 days.

(21) Appl. No.: 11/068,537

(22) Filed: Feb. 28, 2005

(65) Prior Publication Data

US 2006/0195630 A1    Aug. 31, 2006

(51) Int. Cl.
*G06F 3/00* (2006.01)
*G06F 13/12* (2006.01)
*G06F 13/28* (2006.01)
*G06F 7/00* (2006.01)
*G06F 15/00* (2006.01)
*H03M 7/34* (2006.01)
*H03M 7/38* (2006.01)

(52) U.S. Cl. .......... 710/30; 710/68; 712/300; 341/51

(58) Field of Classification Search ............ 710/30, 710/68; 341/51; 712/300
See application file for complete search history.

(56) References Cited

U.S. PATENT DOCUMENTS

| | | | | |
|---|---|---|---|---|
| 5,819,117 A * | 10/1998 | Hansen | ....... | 712/300 |
| 5,944,843 A * | 8/1999 | Sharma et al. | ....... | 714/701 |
| 5,961,640 A * | 10/1999 | Chambers et al. | ....... | 712/300 |
| 6,351,750 B1 * | 2/2002 | Duga et al. | ....... | 707/102 |
| 6,476,745 B1 * | 11/2002 | Evans et al. | ....... | 341/139 |
| 6,483,019 B1 * | 11/2002 | Hamilton | ....... | 84/477 R |
| 7,190,284 B1 * | 3/2007 | Dye et al. | ....... | 341/51 |
| 2003/0150317 A1 * | 8/2003 | Hamilton | ....... | 84/477 R |

* cited by examiner

*Primary Examiner*—Henry W. H. Tsai
*Assistant Examiner*—Tushar S Shah
(74) *Attorney, Agent, or Firm*—Vierra Magen Marcus & DeNiro LLP

(57) ABSTRACT

Embedding endianness information within data and sending and receiving data with the embedded endianness information. Data may be contained in a data structure. To embed endianness information in a data structure, unused bits in a data structure are identified. A number of the unused bits are then selected based on the possible unpacking combinations of the data structure. The endian bit values are set to a pattern to indicate the endianness of the data structure. Data that has been packed by a transmitting module can be unpacked by a receiving module based on the detected endian bits. An algorithm may be used to determine which unused bits to select as the endian bits.

16 Claims, 11 Drawing Sheets

ENDIANNESS INDEPENDENT DATA STRUCTURES

BACKGROUND OF THE INVENTION

1. Field of the Invention

The present invention is directed to endianness in data structures.

2. Description of the Related Art

When hardware components and software modules transmit data to each other, they often pack the data before transmission and unpack the data upon receipt of the data. When packing smaller data elements into larger ones, different combinations of hardware and/or software may do the packing in different fashions. For example, when packing bytes into a 32-bit word, one piece of hardware/software may put the first byte in the least significant position of the word, while another piece may put it in the most significant position. These two pieces of data-packing hardware are said to have different endiannesses.

Endianness is an attribute of a system that indicates whether data values are represented from left to right or right to left. Big endian means that the most significant byte of any multibyte data field is stored at the lowest memory address, which is the larger field address. Little endian means that the least significant byte of any multibyte data field is stored at the lowest memory address, which is also the address of the larger field. Processors and other data processing modules are typically designated as either big endian or little endian. For example, Intel's 80×86 processors and their clones are little endian devices, while Sun's SPARC, Motorola's 68K, and the PowerPC family processors are all big endian devices.

A problem occurs when hardware or software tries to interpret a data structure that was received from hardware or software having a different endianness. In this case, data elements in the received data structure are not where the receiving hardware or software expects them to be. As a result, the data structure is interpreted incorrectly.

Currently, endianness control bits are used in hardware to configure the hardware to interpret a structure in multiple endianness. To use these endianness control bits, a software driver requires an understanding of the entire system in which the hardware operates in order to determine how different pieces of hardware should interpret the structure. It then has to configure the hardware's endianness control bits. This requires each hardware piece to know the endianness of every other instance of data processing hardware and software that may pack or unpack data.

Another current approach is to use software drivers to convert data structures from one endianness to another when necessary. This process includes interpreting the data in one endianness and translating the data structure from one endianness to another (a process known as swizzling). This swizzling process may waste processing time and large numbers of valuable CPU cycles.

SUMMARY OF THE INVENTION

The invention pertains to embedding endianness information within data and sending and receiving data with the embedded endianness information. In one embodiment, a method for transmitting data begins with embedding self describing endianness information within data. The data is then transmitted with the embedded endianness information.

In another embodiment, a method for receiving data begins with receiving data. The received data includes embedded endian information. The embedded endianness information is then retrieved. An unpacking sequence of the data is then determined. The unpacking sequence is associated with the endianness information.

In yet another embodiment, a computer-readable medium is disclosed having a data structure. The data structure comprises a first data field and a second data field. The first data field contains one or more used data bits. The second data field contains one or more unused data bits that include self-describing endianness information.

DETAILED DESCRIPTION

Methods and systems for embedding endianness information within data and sending and receiving data with the embedded endianness information are provided. Data may be contained in a data structure. For example, a data structure of a 32 bit word may contain multiple fields of data. To embed endianness information in a data structure, unused bits in a data structure are identified. A number of the unused bits are then selected based on the possible unpacking combinations of the data structure. The endian bit values are set to a pattern to indicate the endianness of the data structure. No hardware control bits are required to determine the endianness of the data structure, nor must multiple unpackings of a data structure be analyzed to determine which unpacking generates an acceptable data structure.

The first transmitting piece of hardware or software (or any subsequent transmitting hardware/software) in a system of data processing software and/or hardware embeds the endianness information into the data structure. A data structure, or data, may include a word, byte, or some other collection of bits of data. The data structure with the embedded endianness information can be transmitted multiple times between data processing hardware and/or software, each of which may pack or unpack the data structure. Data that has been packed by a transmitting module can be unpacked by a receiving module based on the detected endian bits. An algorithm may be used to determine which unused bits to select as the endian bits. Several variations of the algorithm may be implemented depending on the number of endian bits desired, the number of possible unpackings that can be performed, the format of the data structure, and other factors. In particular, the number and position of unused bits in the data structure could determine which variation of the algorithm to use. The algorithm and some illustrative variations are discussed in more detail below. An example of how an encoded data stream, such as an audio stream, is processed by a system having hardware components with different endianness is discussed below.

Figure 1:
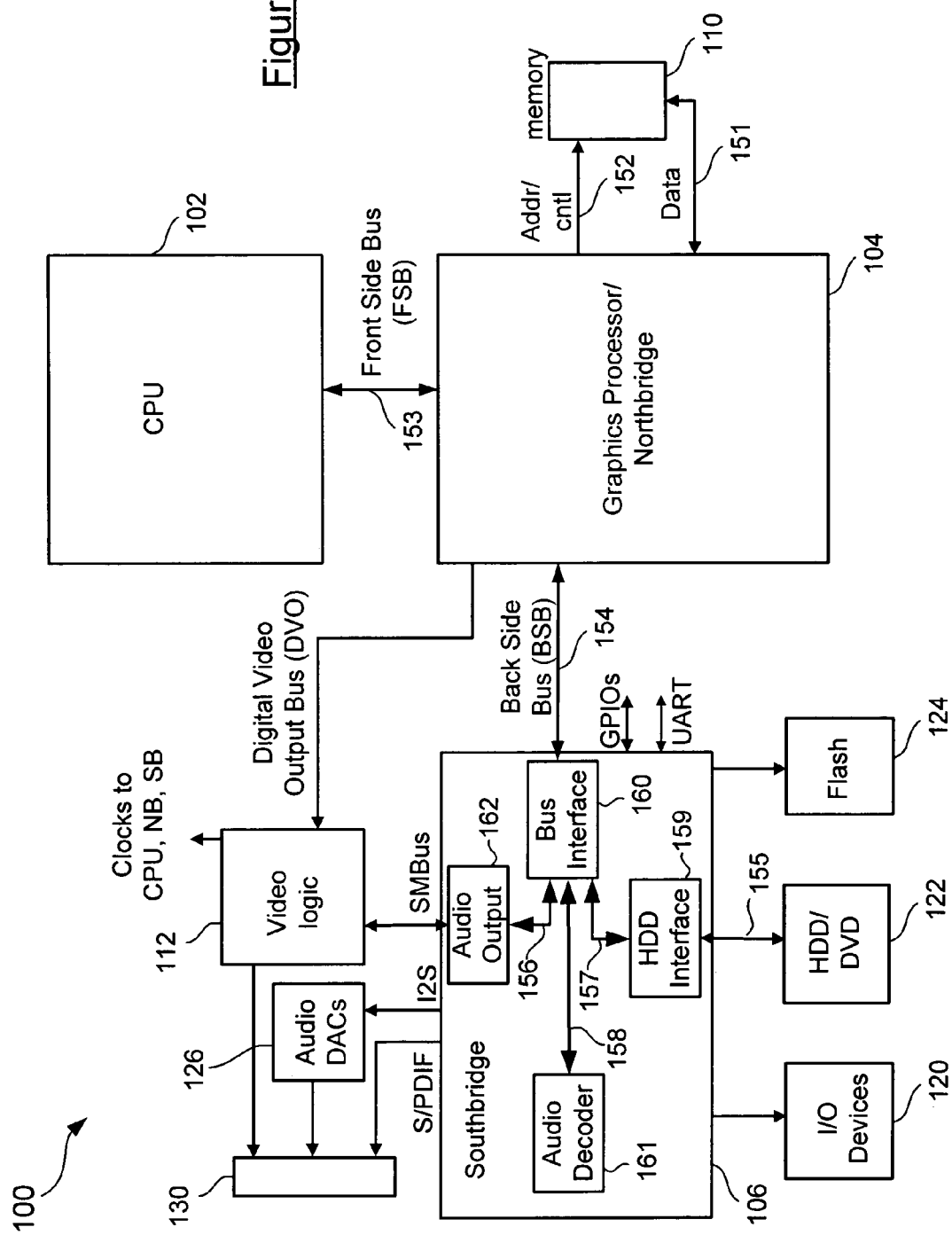
FIG. 1 illustrates an embodiment of a computing device for implementing endianness independent data structures.

FIG. 1 illustrates one embodiment of a computing device 100 in which the endianness independent data structures may be implemented. One example of such a computing device can be a game device for providing multimedia experiences and playing video games that include audio and video. Audio and video data tends to be deterministic, streaming and digital until reaching a digital to analog interface. Within computing device 100, audio and video processing circuits process the data internally as digital data, but output the data on analog signals.

Computing device 100 includes central processing unit (CPU) 102, graphics processor/Northbridge 104, memory 110, video logic 112, audio digital-to-analog converters 126, Southbridge 106, input/output devices 120, HDD and DVD devices 122 and flash 124.

In one embodiment, the terms Northbridge and Southbridge refer to a two-part chip set available from Intel Corporation, Santa Clara, Calif., that communicates with the computer processor and controls interaction with memory, the Peripheral Component Interconnect (PCI) bus, Level 2 cache, and all Accelerated Graphics Port (AGP) activities. Northbridge communicates with the processor using the frontside bus (FSB). Southbridge handles the input/output (I/O) functions of the chipset.

An alternative to this hardware implementation is the Intel Hub Architecture (IHA) which includes the Graphics and AGP Memory Controller Hub (GMCH) and the I/O Controller Hub (ICH). It will be understood that the particular hardware implementation shown herein is merely exemplary and is not intended to limit the scope of the present invention. The invention herein may be implemented on other hardware, all of which are within the scope of the present invention.

Northbridge 104 communicates with memory 110 via address control lines (Addr/cntl) and data lines (Data). In one embodiment, northbridge 104 provides processing functions, memory functions, and serves as an intermediary between CPU 102 and Southbridge 106. Northbridge 104 communicates with Southbridge 106 via a Backside Bus (BSB). Southbridge 106 performs various I/O functions, signal processing and other functions. Southbridge 106 is in communication with I/O devices 120, hard disk drive (HDD) and DVD drives 122, and flash memory 124. Northbridge 104 communicates with video logic 112 via a Digital Video Output Bus (DVO).

Northbridge 104 communicates with Southbridge 106 via a Backside Bus (BSB). Southbridge 106 performs various I/O functions, audio processing and testing functions. Southbridge 106 is in communication with I/O devices 120, hard disk drive (HDD) and DVD drives 122, and flash memory 124. System 100 also includes video logic 112. Northbridge 104 communicates with video logic 112 via a Digital Video Output Bus (DVO). Video logic 112 also includes clock generation circuits which provide clocks to CPU 102, Northbridge 104 and Southbridge 106.

As discussed above, Southbridge 106 provides various audio processing. Southbridge communicates with digital to analog converters 126 via an 12S Bus. 12S is a standard digital audio chip-to-chip unidirectional interface. In its basic form, it consists of a sample clock (SCLK), a master clock (MCLK), a left/right indicator (LRSEL), and a serial data line. An interface 130 is included for connecting system 100 to components outside the system. Southbridge 106 is connected to interface 130 directly. In addition, digital analog converters 126 and video logic 112 are also connected to interface 130.

In one embodiment, system 100 may read an encoded data stream from a hard disk drive, decode it with a hardware audio decoder, and then play it back through an audio output unit. During this process, data travels across a number of different buses. For example, bus 155 between HDD 122 and HDD interface 159 with Southbridge 106 may be a single byte wide, but bus 157 between HDD interface 159 and the Southbridge bus interface 160 could be 32 bits wide. In this case, HDD interface 159 is tasked with packing bytes streaming off HDD 122 into 32-bit dwords to send to bus interface 160. HDD interface 159 could choose to do this packing in either a big-endian or little-endian fashion. Later in the process, audio decoder 161 will need to interpret the encoded audio data as a series of bytes and may need to unpack those bytes if bus 158 between the decoder 161 and bus interface 160 is larger than a byte. Here, the unpacking may also be done in a big-endian or little-endian fashion. If it is done with a different endianness than that of HDD interface 159, then the decode will not be correct.

FIG. 1 is intended as one example of a computing system that can be used to implement the current invention. Other computing devices may be used to implement endianness independent data structures in addition to that illustrated in FIG. 1.

Figure 2:
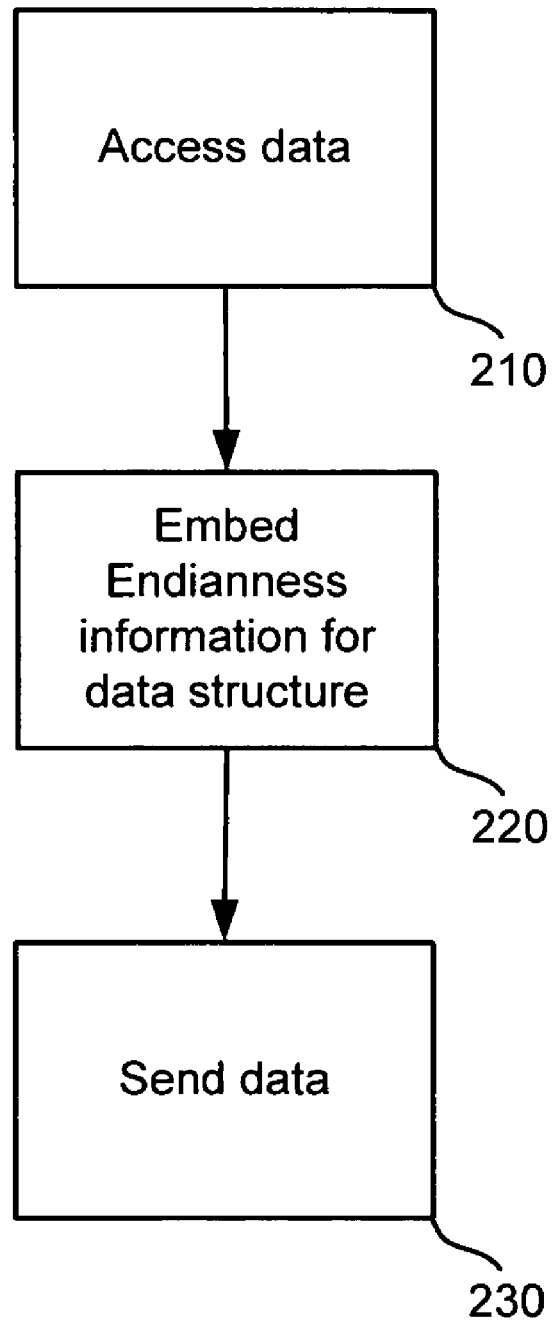
FIG. 2 illustrates an embodiment of a method for sending data having embedded endian information.

FIG. 2 illustrates an embodiment of a method 200 for sending data having embedded endian information. In one embodiment, the transmitted data having embedded endian information may be sent between modules such as those discussed above with respect to system 100 of FIG. 1. Method 200 begins with accessing data at step 210. In one embodiment, data to be transmitted to another module, IC, or some other circuit is accessed at step 210. Next, endianness information is embedded into the data at step 220. As discussed above, the endianness information may include bits embedded in the data structure that determine how the data should be unpacked by the receiving module. Embedding endianness bits into data as in step 220 is discussed in more detail below. The data with the embedded endianness bits in then sent to a receiving module at step 240.

Figure 3:
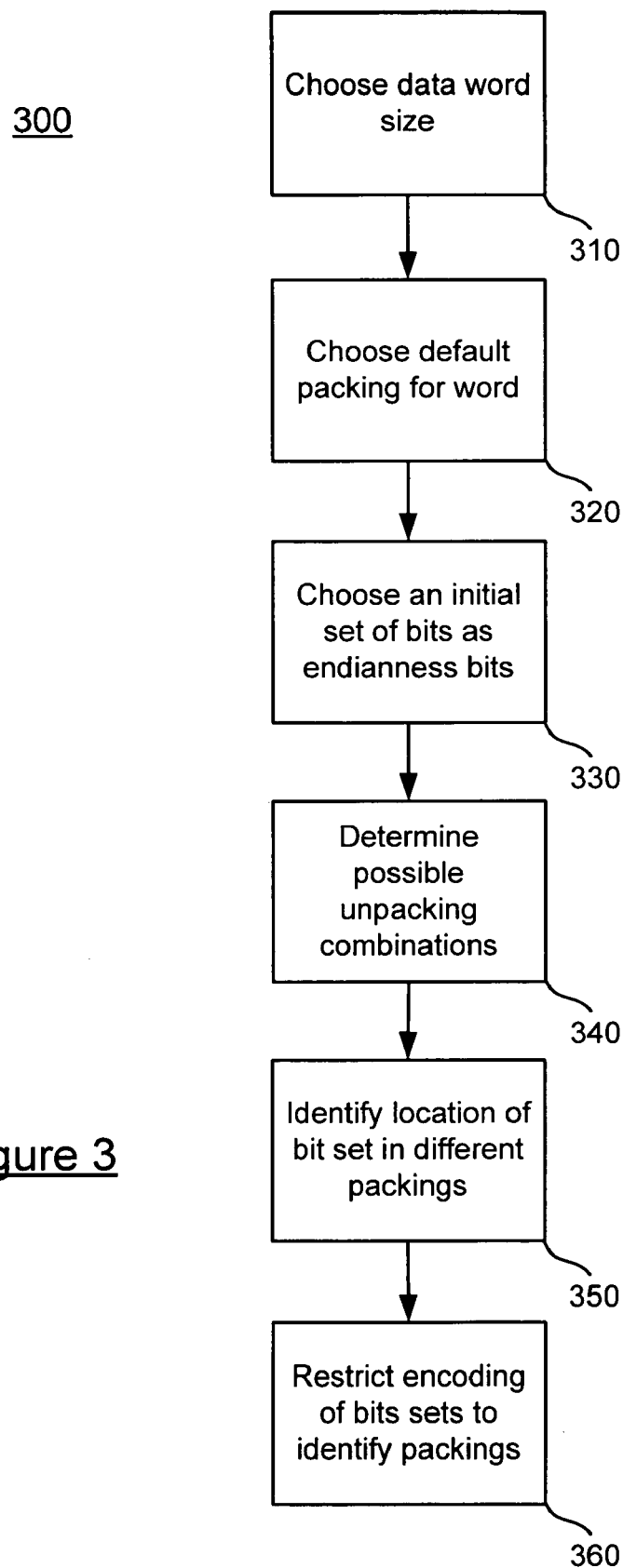
FIG. 3 illustrates an embodiment of a method for embedding endianness information in data.

FIG. 3 illustrates an embodiment for embedding endianness information in data. In one embodiment, method 300 can be used to implement step 220 of method 200 of FIG. 2. Throughout the discussion below, original bits and bit positions are referred to. An original bit is a bit of data that appears at a bit position within data or a data structure. In different endian unpackings of data, original bits may appear at different bit positions within the data. This is discussed in more detail with respect to FIG. 4. First, a data word size is chosen at step 310. In one embodiment, a selected word size is typically a power of 2 bits and is sufficiently large such that hardware and software components of different endianness would not have to pack or unpack this word in and out of larger data structures (larger word sizes). Next, a default packing for the selected word is selected at step 320. The default packing can be an arbitrary selection, but one of the possible packings expected to be encountered within the system. In one embodiment, the default packing will be either big endian or little endian. An initial set of bits is then chosen as the endianness bits at step 330. This initial set of bits may be a single bit, multiple contiguous bits, such as a field, or multiple non-contiguous bits. Given the default packing determined at step 320, the initial set of endian bits will appear at a known position within the word.

Next, the possible unpacking combinations are determined at step 340. At this step, the endian techniques (both packing and unpacking) that can be used to package the data are identified. In one embodiment, the possible unpacking combinations incorporate all the ways that different devices in the system may pack and unpack smaller fields. Locations of the bit set in the different packings are then identified at step 350. In some embodiments, for each different packing identified above, the bit set identified in step 330 will be in a different bit position within the word. In one embodiment, these bit sets can be collectively referred to as a "set of sets." After the locations of the bit sets in different packings are identified, encoding of the bit sets identified in step 350 is restricted in order to identify the different packings at step 360. This is performed so that the different packings can be identified while not affecting any bit positions that may contain used data in some the of unpacking combinations. Several implementations of method 300 may be performed. Some of these implementations are discussed below. The implementations discussed herein are intended to be examples of how method 300 can be used to generate and embed endianness bits in data structures. Other implementations of method 300 are intended to be within the scope of the present invention.

Figure 4A:
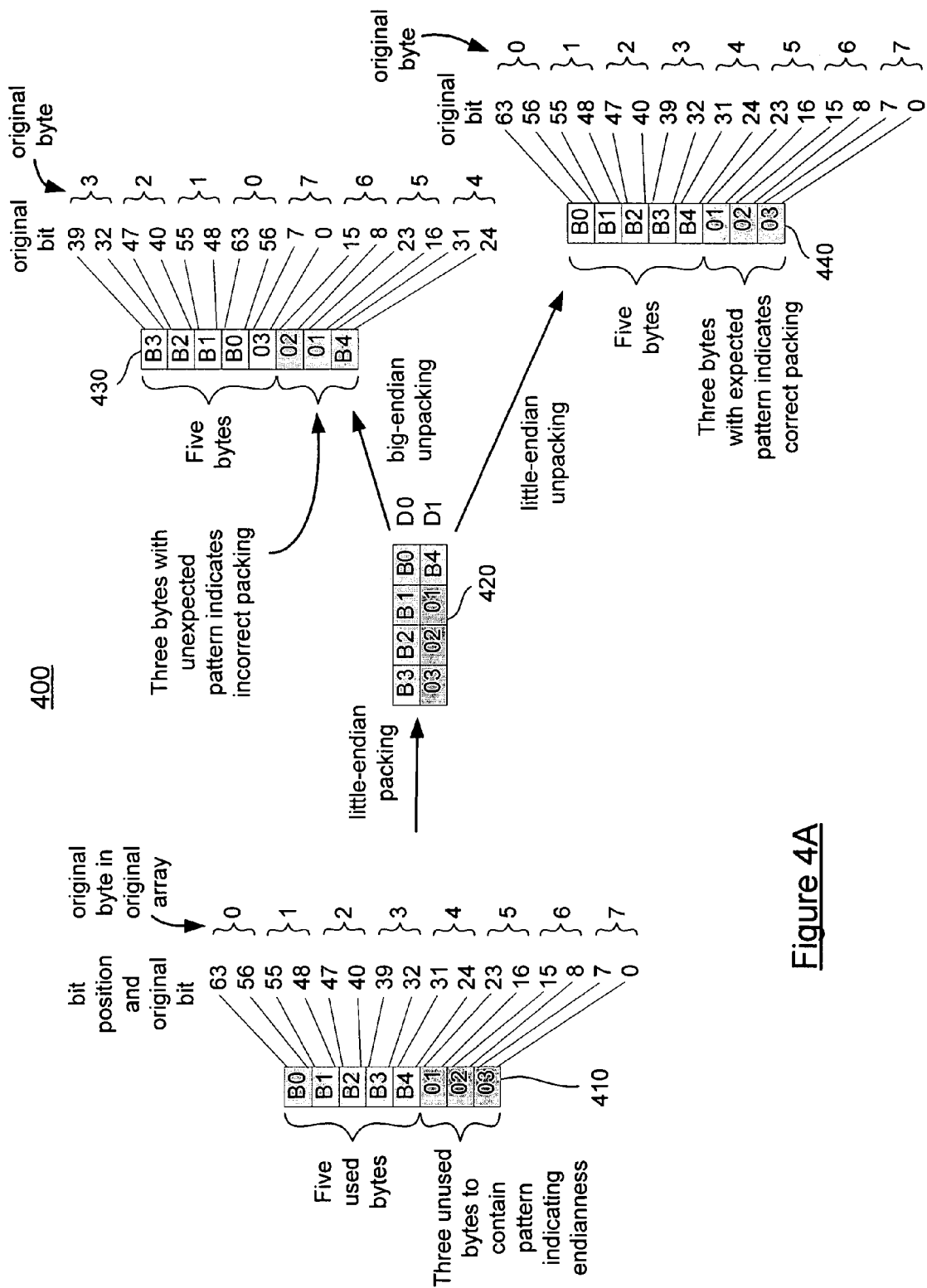
FIG. 4A illustrates an example of data structures unpacked using different endian techniques.

FIG. 4A illustrates an example of data structures packed and unpacked using different endian techniques. FIG. 4A illustrates an array of 8 bytes 410 that is packed into a data structure 420 (that consists of two 32-bit words) using little endian packing. Array 430 illustrates the data of structure 420 after big endian unpacking. Array 440 illustrates the data of data structure 420 after little endian unpacking.

Array 410 includes bytes of used data filled with B0, B1, B2, B3, and B4. The remaining bytes of array 410 are not used, and filled with 01, 02 and 03. For each byte in word 410, the first and last bit positions are indicated as well as the first and last original bit. Thus, for the byte of used data filled with a value of B0, the first bit position is 63 and the last bit position is 56. For the byte filled with a value B4, the first bit position is 31 and the last bit position is 24. In addition, each byte in array 410 is numbered, with the first byte being byte number "0" and the last one being byte number "7".

Figure 4B:
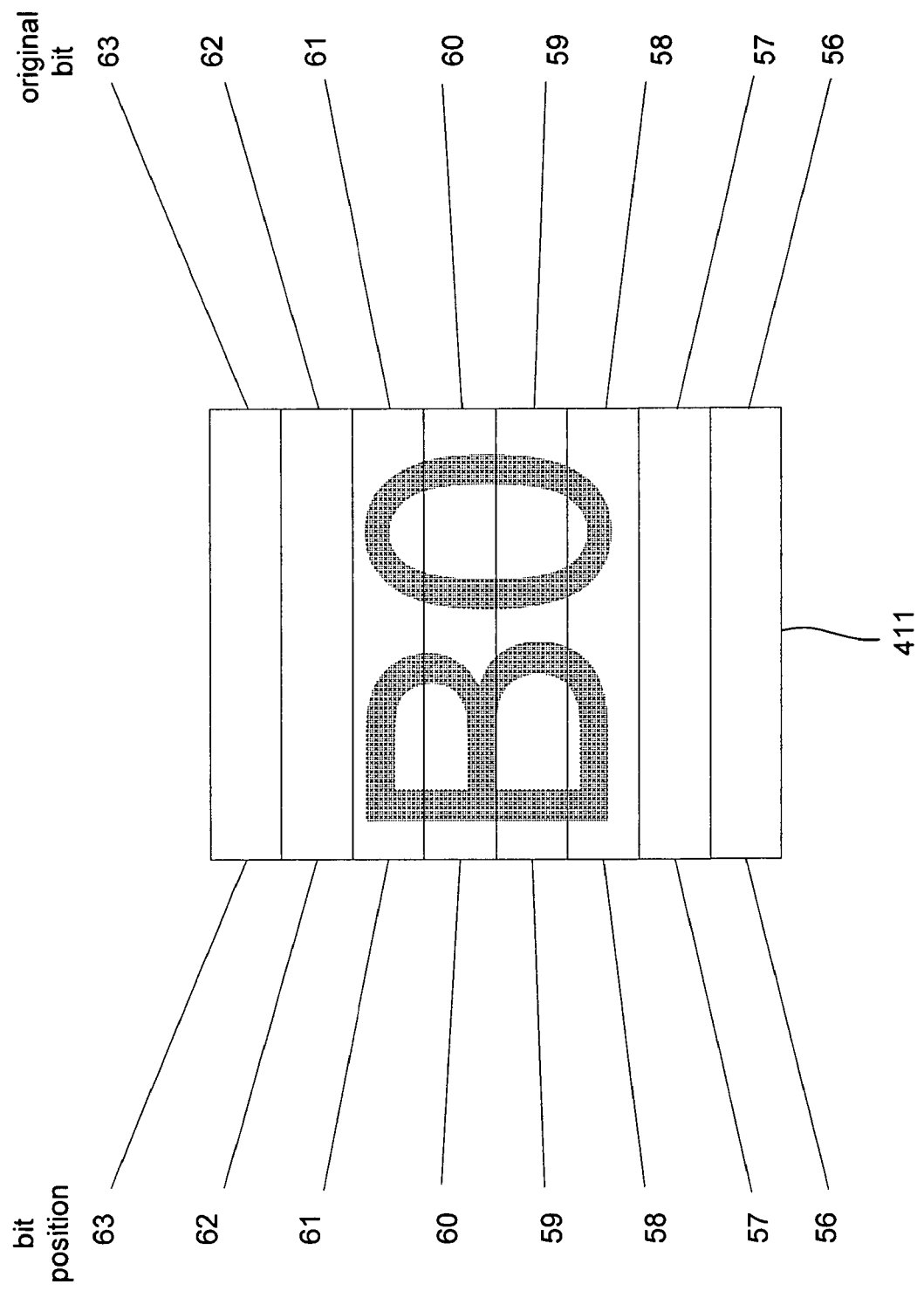
FIG. 4B illustrates an example of bit positioning within a byte.

FIG. 4B illustrates an example of the bit positioning within byte 411 of data within a data structure. Byte 411 is the uppermost byte of array 410 of FIG. 4A filled with data of B0. Byte 411 includes eight bits, comprising bit positions 63-56. All bytes of the arrays and illustrated in FIG. 4A have eight bits as byte 411 illustrated in FIG. 4B.

Array 430 includes the same eight bytes as array 410, but the bytes are in different positions. The original bytes are rearranged after being packed little endian and unpacked big endian. In particular, bytes 5, 6, and 7 of array 430 have an unexpected pattern, indicating that an incorrect endian unpacking technique (big endian, in this case) was used. For example, original byte 3 filled with the value of B3 is now in the byte position 0 of array 430. Original byte 4, filled with the value B4, is now residing in byte position 7 of array 430.

Array 440 retains the original byte ordering as original array 410. In particular, bytes 5, 6, and 7 of array 430 have an expected pattern, indicating that the correct endian unpacking technique (little endian) was used. Generation of endian bits for array 410 is discussed below with respect to method 500.

Figure 5:
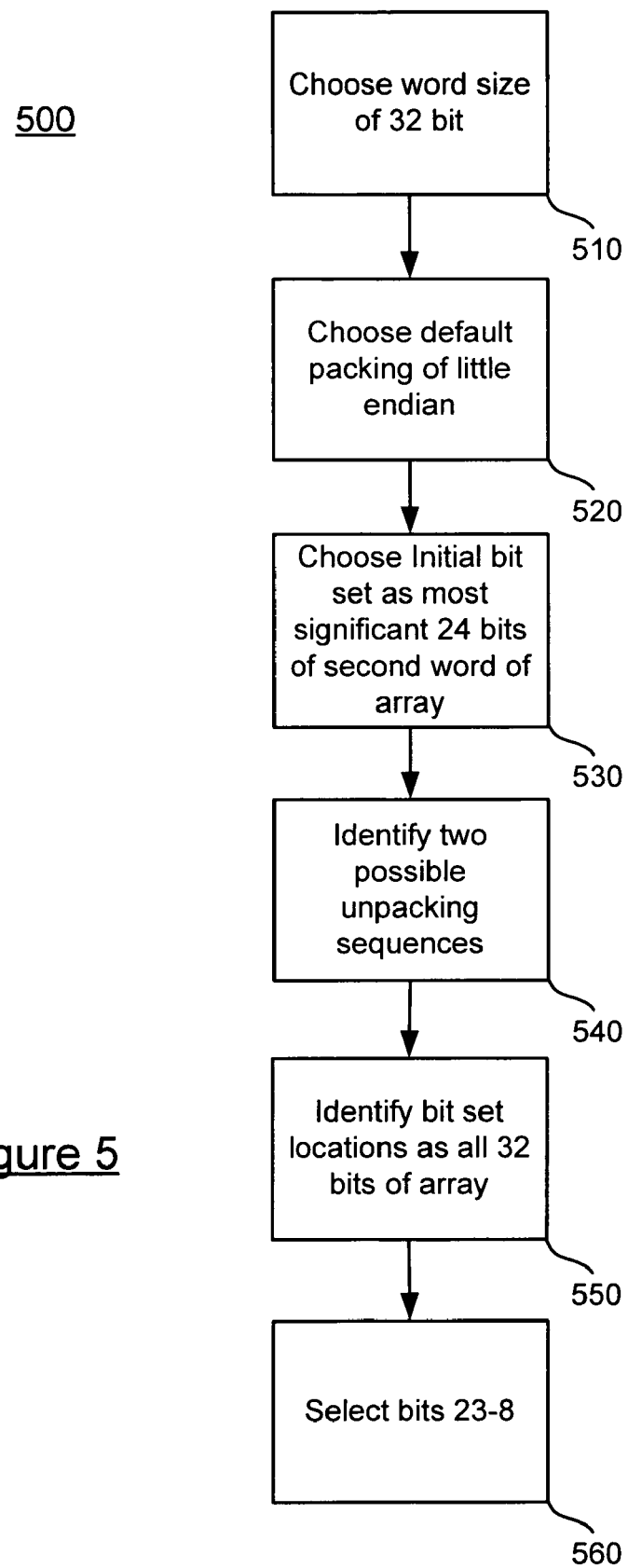
FIG. 5 illustrates an embodiment of a method for embedding endianness information in data utilizing bytes of endian data.

FIG. 5 illustrates an embodiment of a method 500 for embedding endianness information in data utilizing bytes of endian data. Method 500 illustrates an example of applying the steps of method 300 to array 410 of FIG. 4. Method 500 begins by choosing a word size of 32 bits at step 510. The 32-bit word size corresponds to the packing size of the 32-bit data structure 420 in FIG. 4 in which byte array 410 is to be packed into and byte arrays 430 and 440 are unpacked from. Next, a default packing of little endian is selected at step 520. The initial bit set is selected as the most significant 24 bits of the second word of 32-bit data structure 420 at step 530. This is derived by packing 5 bytes (B0-B4) into 32-bit words assuming little endian format, resulting in the availability of the most significant 24 bits of the second word. The 24 bits are filled with bytes with values 03-01, as shown in data structure 420 in FIG. 4. Two possible unpacking sequences are identified at step 540. In the present case, the only possible unpacking sequences are big endian and little endian unpacking, both in 32 bit word to a byte array.

The identified bit set locations are the lower 24 bits, or bytes 5, 6, and 7, of array 410 at step 550. For little endian packing, the bit set residing in the upper-most 24 bits is bits 31-24, 23-16, and 15-8 (or 8-24). For a big endian packing, the bytes will appear swizzled such that the bit set is distributed into bits 7-0, 15-8 and 23-16. Also, the bit set that appears in bits 31-8 of a big endian word are the original bits 7-0, 15-8, and 23-16, labeled above as B4, 01, and 02, respectively. Thus, the set of sets in this case encompasses 32 bits. As shown in FIG. 4, the unused bytes in array 430 take up bits 31-8 and the unused bytes in array 440 take up bits 23-0, collectively taking up bits 31-0 over both unpackings. Next, bits 23-8 are selected as the bits to encode at step 560. Bytes 01 and 02 are located in opposite these unused bit positions in array 430 and array 440. Thus, applying different values to each unused byte 01 and 02, the endianness associated with the proper unpacking can be determined by the arrangement of the two bytes. In one embodiment, no restriction should be applied to bit positions corresponding to the byte B4 in any unpacking because those bit positions are used. Thus, no restriction should be made to bit positions 7-0 (byte B4 uses bit positions 7-0 in big endian unpacking) and bits 31-24 (byte B4 uses bit positions 31-24 in little endian unpacking).

Figure 6:
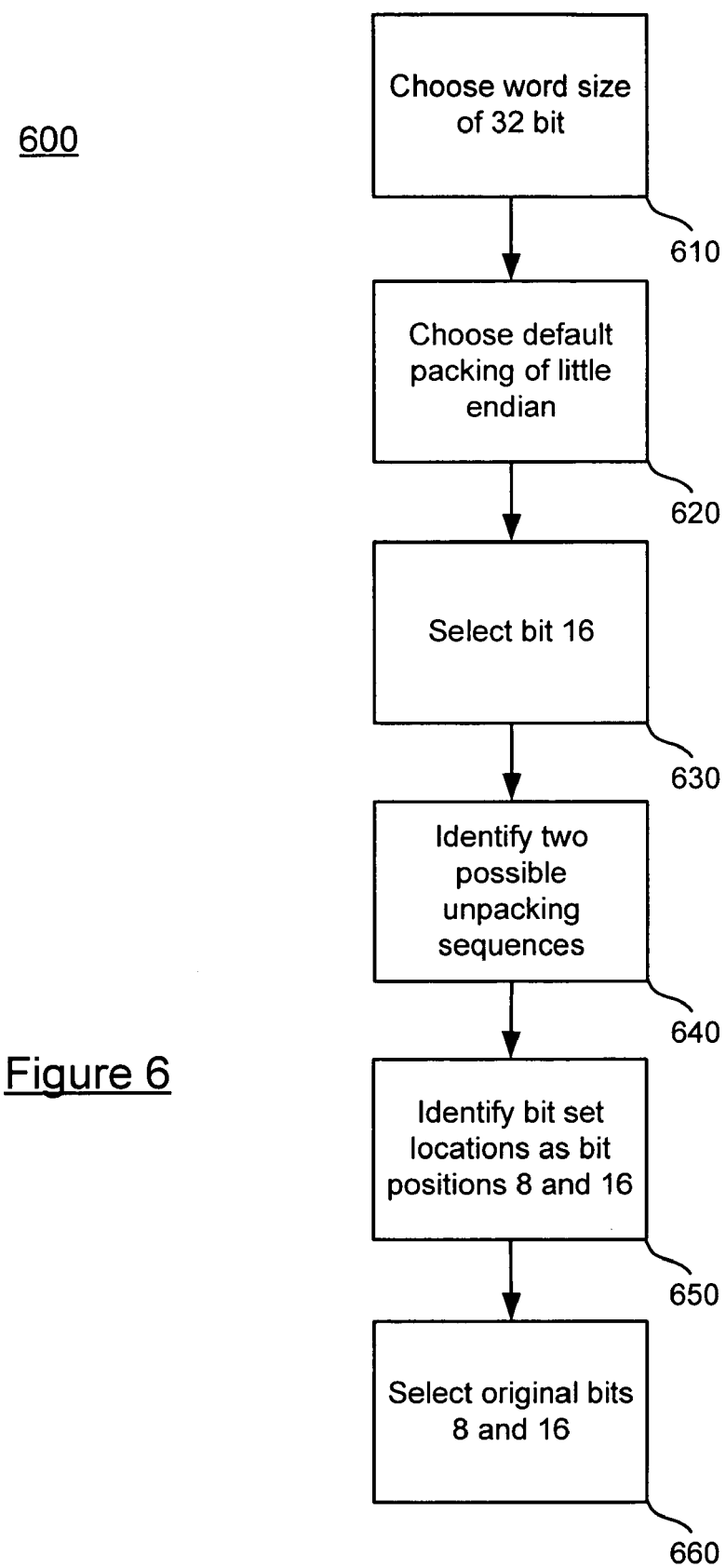
FIG. 6 illustrates an embodiment of a method for embedding endianness information in data utilizing bits of endian data.

FIG. 6 illustrates an embodiment of a method 600 for embedding endianness information in data utilizing bits of endian data. Using bits of endianness information differs from using entire bytes as discussed above in method 500. First, a word size 32 bits is selected at step 610. Next, a default packing of little endian is selected at step 620. Step 610 and 620 are similar to steps 510 and 520 of method 500. Next, original bit 16 is selected as the initial set of endianness bits at step 630. Two possible unpacking sequences are then identified at step 640.

Bit positions 8 and 16 are identified as the bit set locations in the different packings at step 650. For little endian unpacking, original bit 16 will remain in its original position of bit position 16. For big endian unpacking, original bit 16 will appear in the bit position of bit 8 and original bit 8 will appear in the position of bit 16. This is illustrated in FIG. 4. Accordingly, the set of sets for method 600 consists of the bits 8 and 16. Next, original bits 8 and 16 are restricted for encoding at step 660. In this case, bits 8 and 16 are both unused data location and can be set to any value. For example, default little endian packing bit 16 can be set to 0 and bit 8 can be set to 1. In this case, if an unpacked word has these settings, it was unpacked as little endian. If a word has bit 16 set to 1 and bit 8 set to 0, then it can be determined that the bytes were either packed as big endian or the word was byte swizzled somewhere during processing. In one embodiment, this is effectively a little endian unpacking followed by a big endian packing.

Figure 7:
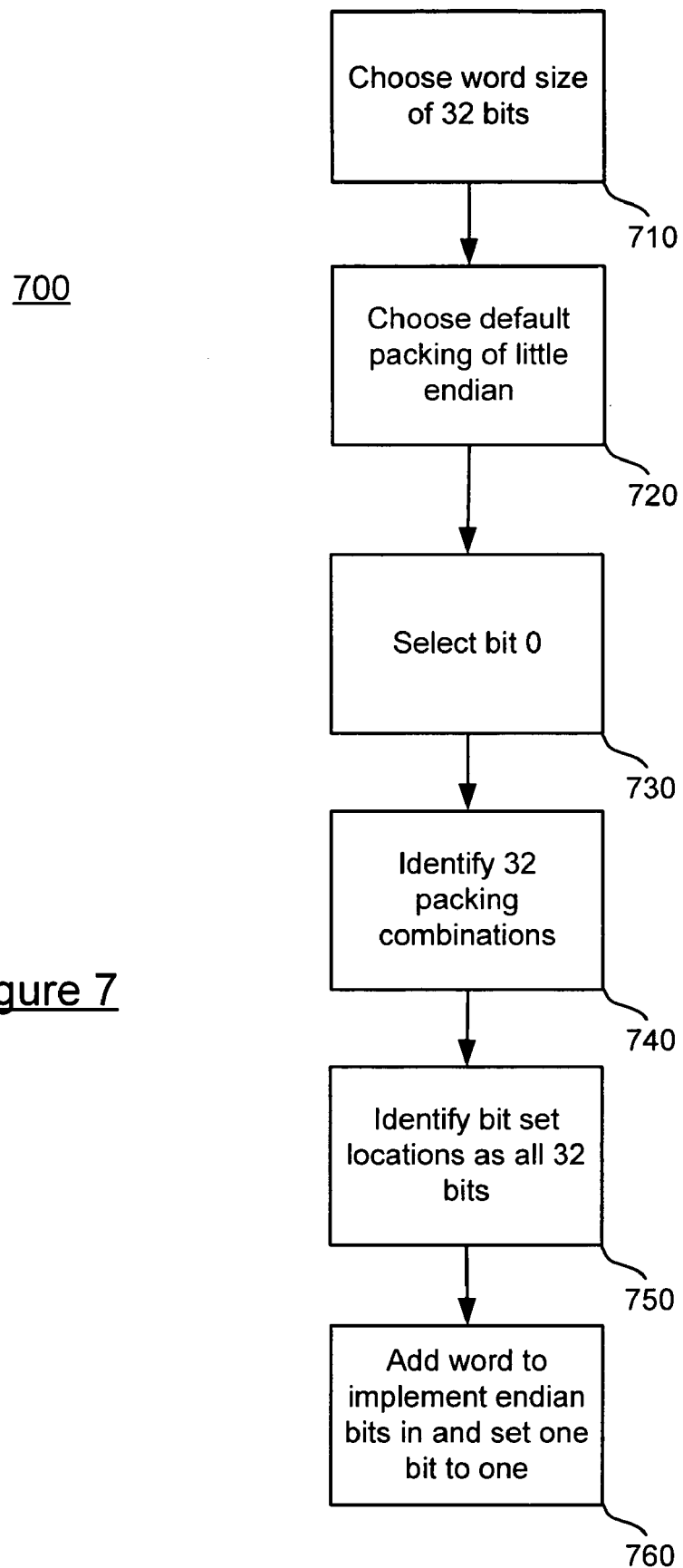
FIG. 7 illustrates an embodiment of a method for embedding endianness information in data having several packing combinations.

FIG. 7 illustrates an embodiment of a method 700 for embedding endianness information in data having several packing combinations. Method 700 begins with selecting a word size of 32 bits. A default packing of little endian is selected at step 720 for each packing operation. Steps 710 and 720 are similar to steps 510 and 520 of method 500. The initial set of bits is selected as bit 0 at step 730. In the case of method 700, the bits can be packed into two bit quanta, two bit quanta into 4 bit nybbles, 4 bit nybbles into 8 bit bytes, 8 bit bytes into 16 bit words, and 16 bit words into 32 bit words. This provides 5 different packing operations, each of which can be done in big or little endian fashion. The total number of packing combinations is therefore 2×2×2×2×2, or 32 ways of packing bits.

Next, the location of the bit sets in the different packings is determined to comprise a 32 bits of the 32-bit word at step 750. For example, if all 5 packings are done in a little endian fashion, bit 0 will be in its original bit position within the original word. If all 5 packings are done in a big endian fashion, then bit 0 will appear in the position of bit 31 of its original word. If all 32 possible packings are enumerated, bit 0 will appear in a different bit position for each of the thirty-two sequences of packing. Thus, the set of sets consists of all 32 bits of the word. Next, a word is added to implement the endian bits wherein one bit is set to one at step 760. In one embodiment, a word can be added if no empty 32-bit words exist in the data structure. When a word is added, bit 0 (or any bit) can be set to 1 and all other bits set to 0. When receiving the packed or unpacked data structure, the endian sequence of the data can be determined by the location of the endianness bits within the endian word of the data structure.

In one embodiment, the binary representation of the bit in the 32-bit word can be used to determine the unpacking sequence. For example, after a sequence of packing wherein bit zero is set to one, suppose the packed endian word has bit 24 set to 1. This is represented as 11000 in binary format. In this case, the least significant bit is 0 and identifies that bits were packed into a 2 bit quanta in little endian fashion. The next two bits are 0 as well, indicating little endian packing for 2 bit quanta into nybbles and nybbles into bytes. The two most significant bits are 1, indicating big endian packing for bytes into 16 bit words and 16 bit words into 32 bit words. Method 700 can be generalized further to deal with different word sizes as understood by those in the art.

Figure 8:
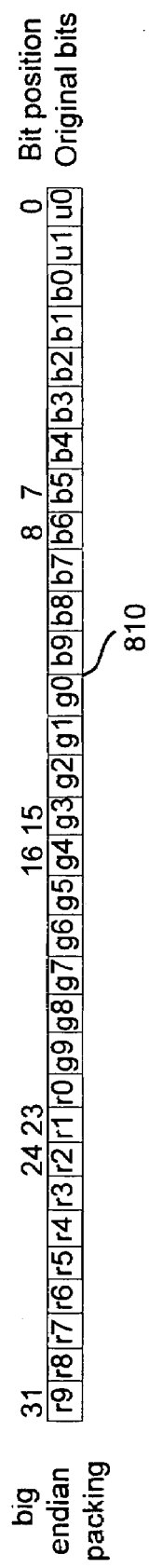
FIG. 8 illustrates an example of pixel encoding data structures unpacked using different endian techniques.
Figure 8:
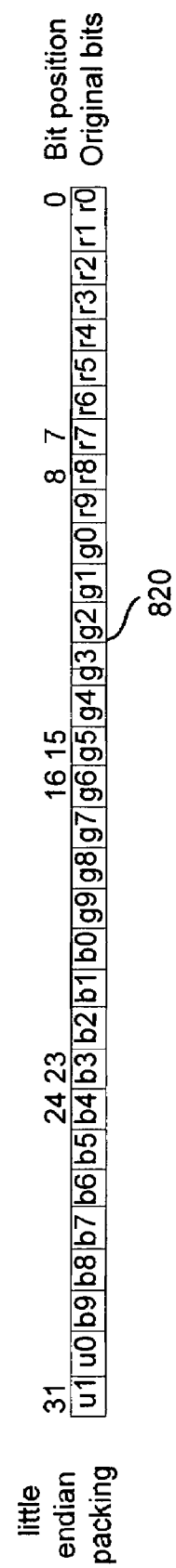

In one embodiment, the present invention can be applied to data structures or fields which are not limited to a power of 2 in size. For example, a 32 bit word may contain three 10-bit fields and one 2-bit filed. This may be implemented in the case of pixel encoding data. FIG. 8 illustrates an example of pixel encoding data structures unpacked using different endian techniques. The 32-bit pixel encoding words 810 and 820 contain four bit fields, a 10 bit R, G, and B, and a 2-bit U field. Such data structures are commonly used to encode a pixel where the R, G, and B fields represent 10 bit red, green, and blue values. The U field contains two unused bits for providing other information. The packing of these bit fields into a word is not defined by any standard, but is generally left up to each individual compiler. Word 810 is little endian, where the R elements indicate the least significant bits of a word. Word 820 indicates big endian, where the R elements occupy the most significant bits. These two packings of FIG. 8 have individual bits of each field numbered.

Figure 9:
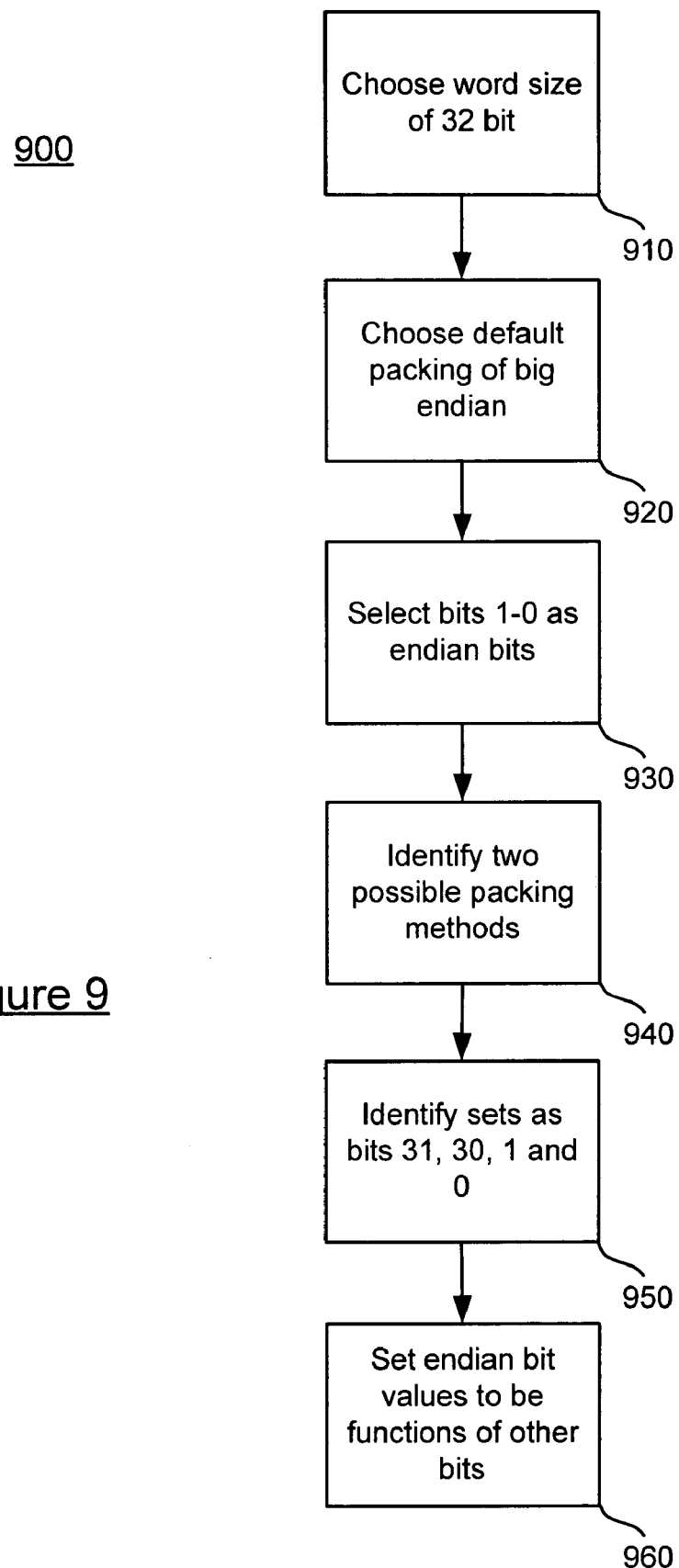
FIG. 9 illustrates an embodiment of a method for embedding endianness information in data utilizing endian bit values as functions of other data.

FIG. 9 illustrates an embodiment of a method for embedding endianness information in data utilizing endian bit values as functions of other data. In one embodiment, method 900 can be used to implement embedding of endianness information in word 810 of FIG. 8. A word size of 32 bits is selected at step 910. Next, a default packing of big endian is chosen at step 920. This is illustrated in FIG. 8. Bits 1-0 are then selected as the endian bits at step 930. In word 810 having big endian packing, bits 1-0 are bits U1 and U0. Next, two possible packing methods of big endian and little endian are identified at step 940. The set of sets is identified as bits 31, 30, 1, and 0, at step 950. This corresponds to u1 and u0 bits appearing at bit positions 1 and 0 for big endian unpacking, as in word 820, and bit positions 31 and 30 for little endian unpacking, as in word 820.

Endian bit values are then set to be functions of other bits at step 960. In the embodiments discussed with reference to methods 500, 600, and 700, the endianness bits were set to constant values since different packings change the location of the endianness bits with each other, all in positions of unused data. This is not applicable in the present case because the bits change positions with data that is used and has restrictions on its encoding. For example, bits U1 and U0 can't be restricted to 0 because all zeros is a valid encoding for the R field. If a component attempted to interpret a structure that had the entire field R, U1 and U0 set to zero, it would see all zeros in the set of sets (bits 31, 30, 1, and 0). Regardless of the endianness used in packing, a receiving component would be unable to determine the endianness of the structure.

Since constant values cannot be used, the endianness bits are set to functions of other bits in the data structure. In one embodiment, the endianness bits are set such that they force a parity among certain bits within the set of sets. The parity of the two bits should be even for one packing and odd for the other. In one embodiment, even parity means that the number of 1 bits in a set is even, so with only two bits in a set even parity is achieved if both bits are 0 or both bits are 1. Odd parity means the number of 1 bits is odd. Thus, the two bits will not be equal.

The bit position of a first endianness bit in the default packing is selected for representing the default packing. The bit position of the other endianness bit in the alternate packing is selected for representing the alternate packing. The parity can be determined from each of these bit positions (the bit positions are in different endian unpackings). Thus, selecting U0 as the first endianness bit in the default packing (word 810, bit position 0) and U1 as the other endianness bit in the alternate packing (word 820, bit position 1), we can set the parity as even for default packing and odd for alternate packing. Thus, bit U0 is set to the same value as bit position 31. Bit U1 is set to the opposite value of bit 0. Detecting the endianness now requires determining if bit positions 0 and 31 have equal or odd parity. When the endianness bits are equal, the default packing is used. If they are not equal, then alternate packing is used.

In one embodiment, this method of selecting and setting parity bits does not require the component that is encoding the structure to know how the structure will be packed. This is important in the above example where, for instance, a C structure coding is used because it may be compiled on different platforms with different endiannesses. In one embodiment, the code below works with either packing to set the endianness bits correctly in this case.

```
typedef struct {
    unsigned r:10, g:10, b:10;
    unsigned u:2;
} pixel;
/* sets endianness bits (in "u" field) assuming that r, g, and b are coded */
pixel set_endianness(pixel p)
```

-continued

```
{
  unsigned u1, u0;
  u0 = (p.r >> 9) & 1; /* select bit 9 of "r" */
  u1 = (~p.r) & 1; /* select bit 0 of "r" and invert it */
  p.u = (u1 << 1) | u0;
  return p;
}
```

Figure 10:
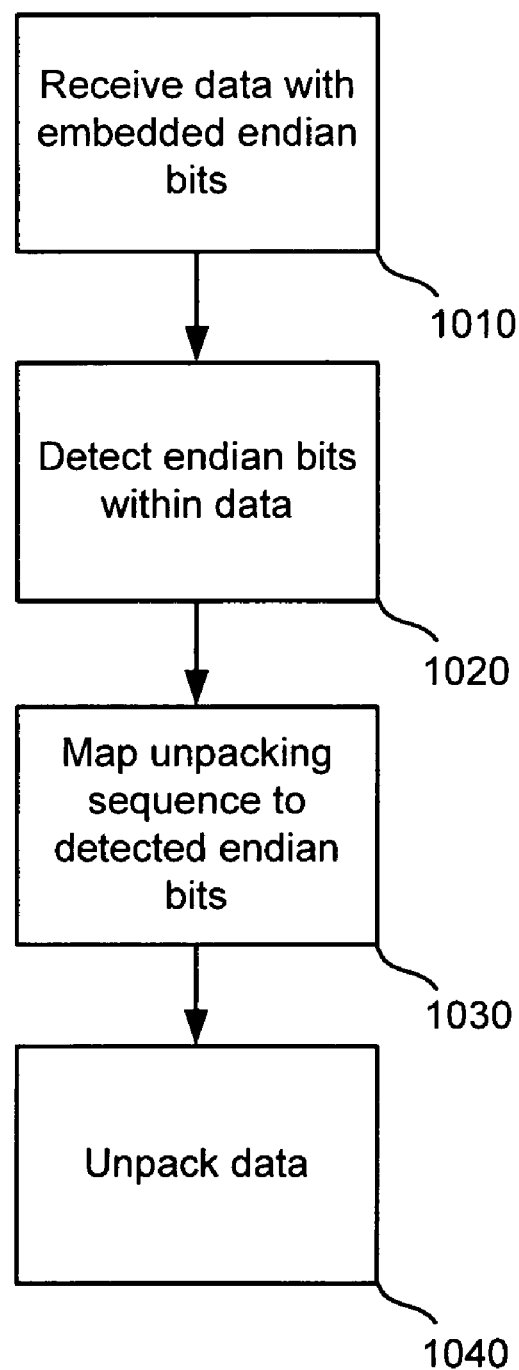
FIG. 10 illustrates an embodiment of a method for unpacking data having embedded endian information.

FIG. 10 illustrates an embodiment of a method for unpacking data having embedded endian information. Data with embedded endian bits is received at step 1010. The endian bits are detected within the data at step 1020. In one embodiment, some prior knowledge of the location of the endian bits is required by the receiving module. After the endian bits are detected, the unpacking sequence associated with the endian bits is mapped to the detected endian bits at step 1030. Once the unpacking sequence is known the data is unpacked at step 1040.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for transmitting data, comprising:
   identifying ways a system is capable of unpacking data and the resulting data position for each unpacking of a plurality of unpackings, the data has at least one unused bit;
   identifying a set of bits within the data that is unused in each unpacking of the plurality of unpackings;
   embedding self describing endianness information within the identified set of unused bits in the data, the endianness information describing how the data should be unpacked; and
   transmitting the data with the embedded self describing endianness information.

2. The method of claim 1, wherein the self describing endianness information is within one or more bits having a constant value.

3. The method of claim 1, wherein embedding the self describing endianness information includes:
   identifying the endian techniques to be used to format the data; and
   generating a pattern of endianness bits from the identified endian techniques.

4. The method of claim 1, wherein embedding the self describing endianness information includes:
   identifying a number of combinations of endian techniques that can be used to package the data, the number of combinations being four or more;
   selecting a group of unused bits as endian bits that do not interfere with used bits in the identified endian techniques.

5. A method for receiving data, comprising:
   receiving data that includes embedded endian information in the data, the endianness information describing how the data should be unpacked, a value that is used to represent how the data should be unpacked is encoded as a function of one or more used data bits in the data;
   retrieving the embedded endianness information;
   decoding the endianness information based on both the embedded endianness information and the one or more used data bits; and
   determining an unpacking sequence of the data, the unpacking sequence associated with the endianness information.

6. The method of claim 5, wherein retrieving the embedded endianness information includes:
   determining the location within the data of one or more endian bits.

7. The method of claim 5, wherein the decoding the endian information includes:
   determining the parity of two or more endian bits, the two or more endian bits comprising a subset of the bits of one or more words that contain the bits.

8. The method of claim 5, wherein retrieving the embedded endianness information includes:
   determining a pattern of data in endianness bits.

9. A computer-readable storage device for storing data for access by an application program being executed on a computer, comprising:
   a data structure stored on said memory, said data structure including information resident in a computer readable storage device used by said application program and including:
   a first data field containing one or more used data bits; and
   a second data field containing one or more unused data bits, the one or more unused data bits including self-describing endianness information that is used to unpack data within the data structure, the endianness information pertains to a first unpacking of a plurality of unpackings, the value that is used to represent the first unpacking is a function of the one or more used data bits in the first field and is selected to achieve a particular parity between the value and the one or more used data bits in the first field.

10. The computer-readable storage device of claim 9, wherein the self-describing endianness information includes a number of non-contiguous bits.

11. The computer-readable storage device of claim 9, wherein the second data field is appended to the first data field.

12. The computer-readable storage device of claim 9, wherein the self-describing endianness information indicates a sequence for unpacking the data structure.

13. The method of claim 5, wherein the decoding the endianness information is based on a parity of the embedded endianness information and the one or more used data bits.

14. The method of claim 1, wherein the identifying all potential ways to unpack data by a system includes identifying a sequence of two or more unpacking operations.

15. The method of claim 1, further comprising:
   receiving the data with the embedded self describing endianness information; and
   determining how to unpack the data based on the self describing endianness information, the self describing endianness information uniquely identifies multiple packing operations that occurred between transmitting the data and receiving the data.

16. The method of claim 5, further comprising unpacking the received data based on the unpacking sequence.

* * * * *

UNITED STATES PATENT AND TRADEMARK OFFICE
CERTIFICATE OF CORRECTION

PATENT NO. : 7,587,526 B2  
APPLICATION NO. : 11/068537  
DATED : September 8, 2009  
INVENTOR(S) : Walters et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 506 days.

Signed and Sealed this

Twenty-first Day of September, 2010

David J. Kappos  
*Director of the United States Patent and Trademark Office*